United States Patent [19]

Ober et al.

[11] Patent Number: 4,632,199
[45] Date of Patent: Dec. 30, 1986

[54] ELECTRONIC BALANCE FOR USE IN POTENTIALLY EXPLOSIVE AREAS

[75] Inventors: Jürgen Ober; Franz-Josef Melcher, both of Hardegsen; Erich Knothe, Bovenden, all of Fed. Rep. of Germany

[73] Assignee: Sartorius GmbH, Fed. Rep. of Germany

[21] Appl. No.: 721,439

[22] Filed: Apr. 9, 1985

[30] Foreign Application Priority Data

Oct. 17, 1984 [DE] Fed. Rep. of Germany ....... 3437959

[51] Int. Cl.⁴ ............................................ G01G 21/28
[52] U.S. Cl. ...................................... 177/238; 177/180
[58] Field of Search .......................... 177/180, 238–243

[56] References Cited

U.S. PATENT DOCUMENTS 4,274,500 6/1981 Kuhnle ............................ 177/239 X
4,320,809 3/1982 Knothe et al. ...................... 177/243
4,416,343 11/1983 Knothe et al. ...................... 177/180

Primary Examiner—George H. Miller, Jr.
Attorney, Agent, or Firm—Eric P. Schellin

[57] ABSTRACT

In an electronic balance for application in potentially explosive areas, the weighing system, the electronic evaluation unit and the digital display unit have an intrinsically safe design with regard to the possibility of explosions. All lead connections are supplied with low voltages and the power unit when present is located outside the electronic balance and connected to the electronic balance via an explosion-safe lead and plug connections with an intrinsically safe design with regard to an explosion. In an alternative the power unit can be encapsulated in a pressure-proof manner, powder-filled, force-ventilated or located outside the potentially combustible gaseous explosive area. It is also contemplated that a battery which is intrinsically safe with regard to explosions can also be used in the housing of the electronic balance instead of a separate power unit.

7 Claims, 4 Drawing Figures

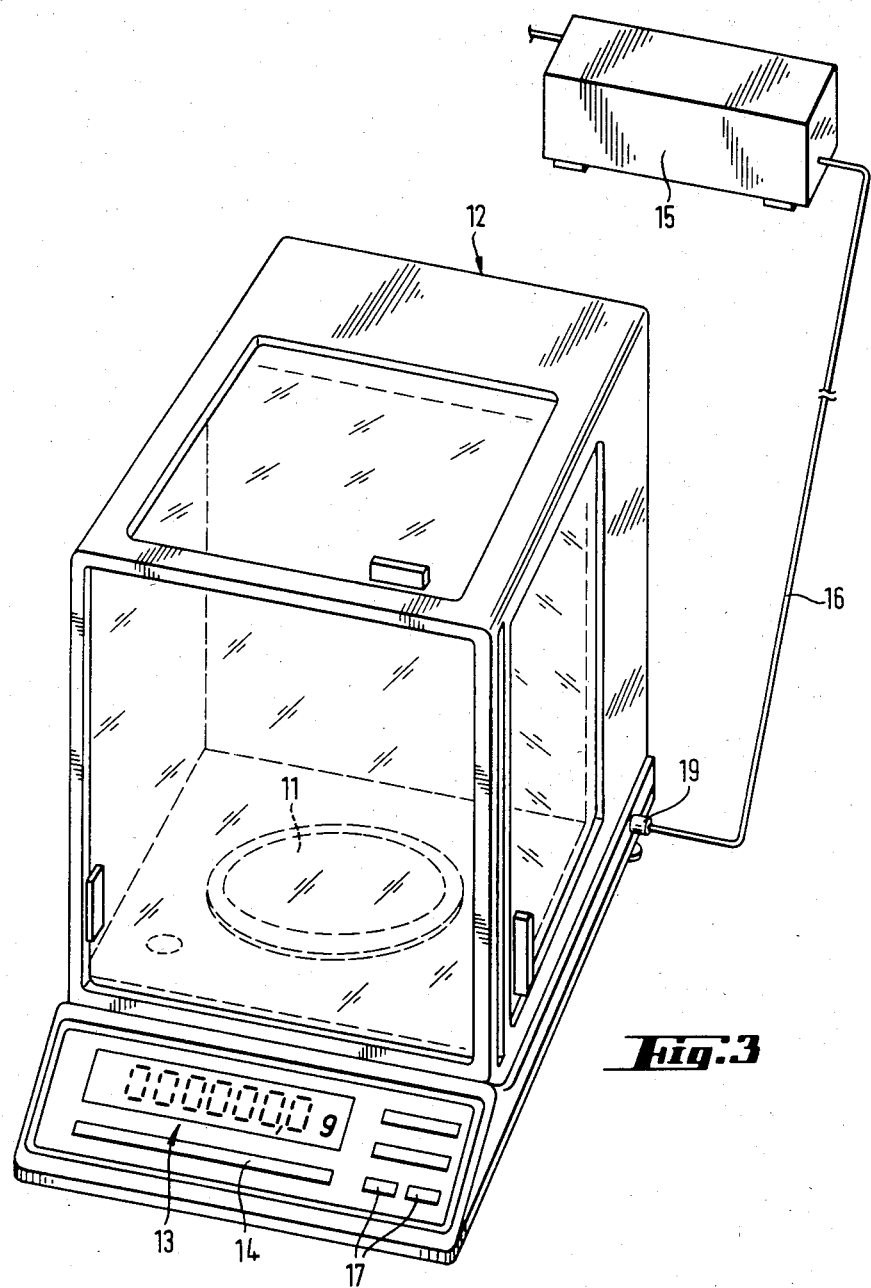
Fig:3

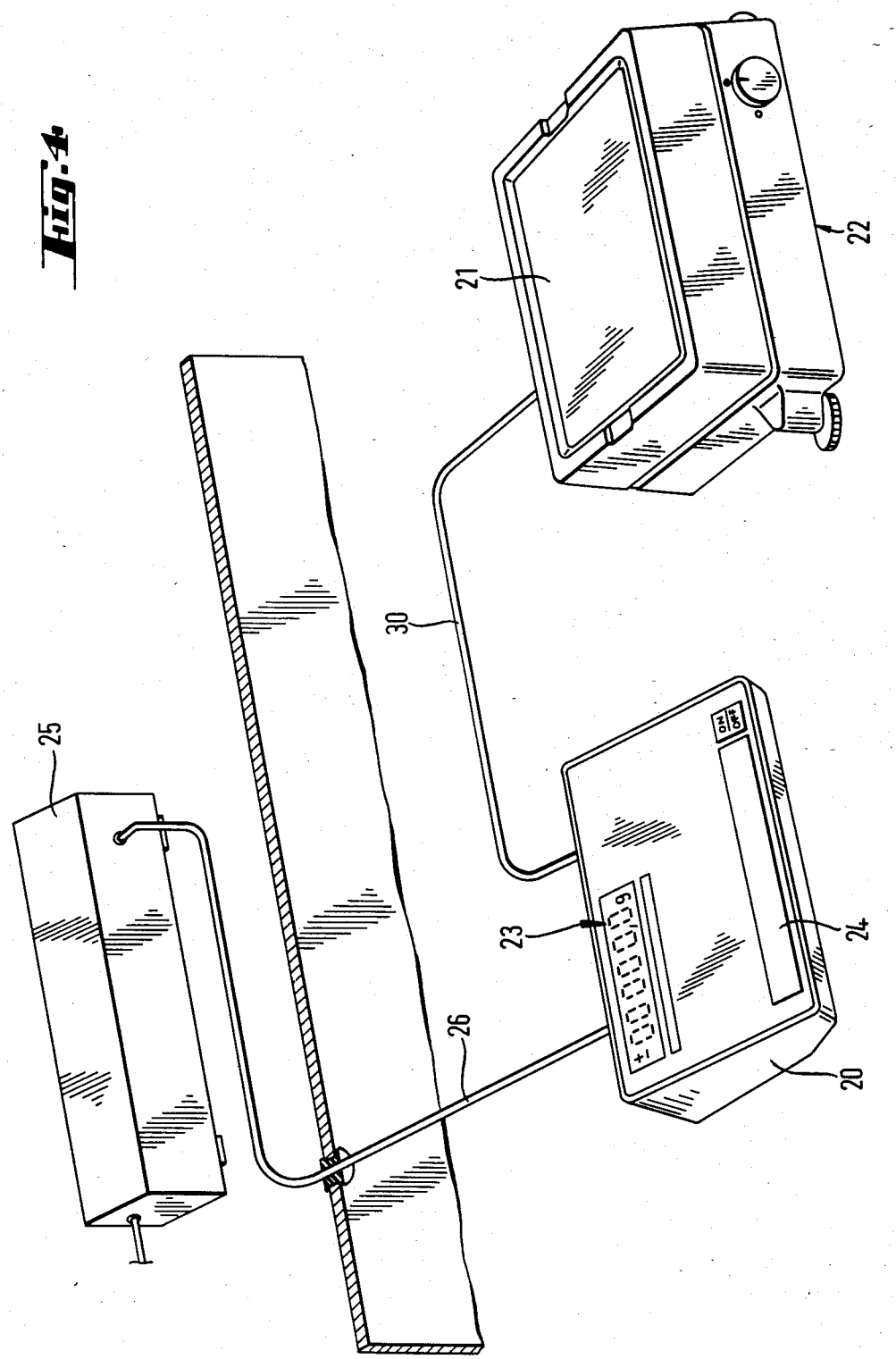

ELECTRONIC BALANCE FOR USE IN POTENTIALLY EXPLOSIVE AREAS

BACKGROUND OF THE INVENTION

The invention is relates to an electronic balance for use in potentially explosive areas, consisting of a weighing system, an electronic evaluation unit and a digital display unit. The term "electronic balance" includes in this connection both a balance in which the mechanical portion of a weighing system, electronic components and display are located in a single housing and also a balance in which the weighing system, electronic components and display are divided between two housings.

Balances of this type are generally known. DE-OS 32 08 015 gives an example of them. However, the filling with an explosion-inhibiting granulate suggested in the patent results, just as do the older solutions it cites such as filling with a silicon fluid or encapsulation by a pressure-proof housing, in relatively cumbersome heavy balances whose construction differs considerably from that of normal, non-explosion-proof balances. The U.S. Pat. No. 4,416,343 is also cited to show a manner of solving the problem.

The invention has as an object the task of creating an electronic balance for use in potentially explosive areas which does not require protective arrangements against explosions inside the electronic balance itself which would increase unduly its weight and whose construction differs as little as possible from that of conventional non-explosion-proof balances.

The invention achieves this object essentially as follows: The weighing system, the electronic evaluation unit and the digital display unit are made intrinsically safe with regard to possibilities of explosions in a combustible gaseous environment, for instance. All lead connections are supplied only with low voltages and any power unit is located outside the electronic balance and is connected to the electronic balance via an explosive-safe lead and plug connections with an intrinsically safe construction with regard to explosions.

All essential functional parts are therefore intrinsically safe, only supplied with low voltages and any power unit present, which is difficult to make intrinsically safe, is located externally and is appropriately protected, e.g. by means of pressure-proof encapsulation, sand filling, forced draft or simply by being located outside the potentially explosive environment.

The mechanical weighing system, the electronic evaluation unit and the digital display unit can, depending on the requirements of the particular application, be combined in one housing or divided between two housings, whereby these two housings are connected to one another by a lead and plug connections with an intrinsically safe design with regard to the possibility of an explosion.

The electronic balance can also advantageously comprise a battery which is intrinsically safe with regard to explosions, which eliminates the need to protect the power.

BRIEF DESCRIPTION OF THE INVENTION

The invention is described below with reference made to the perspective schematic figures.

FIG. 3 shows an electronic analytical balance with external, powder-filled power unit.

FIG. 4 shows an electronic balance with the mechanical weighing system separate from the electronic evaluation unit and the digital display unit and with a power unit outside the potentially explosive area.

DETAILED DESCRIPTION OF THE INVENTION

Figure 1:
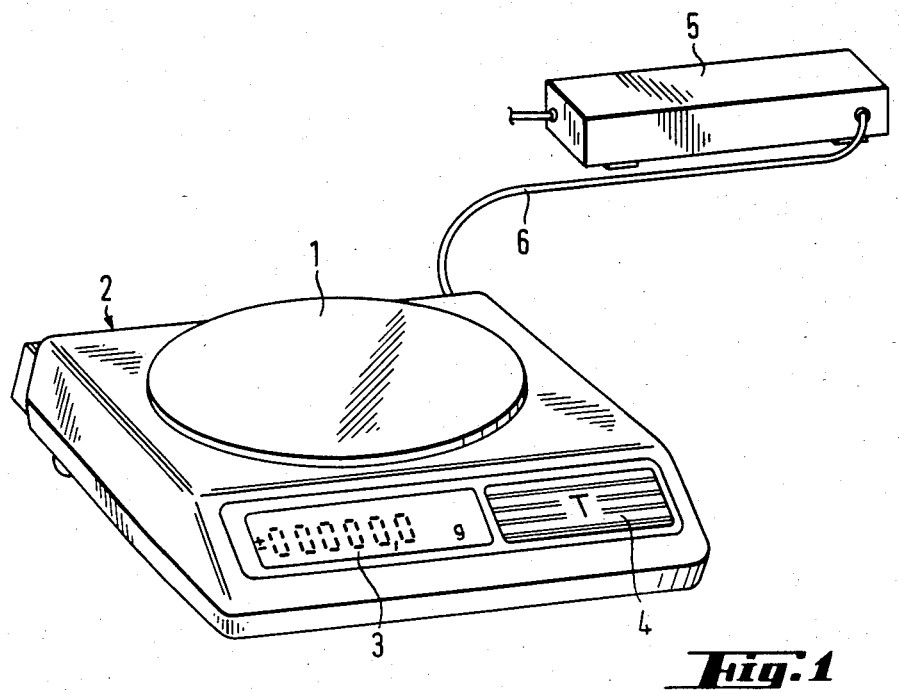
FIG. 1 shows an electronic balance with scale on top with an external pressure-encapsulated power unit.

The electronic balance shown in FIG. 1 consists of housing 2, balance scale 1 for putting on the material to be weighed, digital display unit 3 and operating button 4, e.g. for taring. The mechanical weighing system is located under balance pan 1 in housing 2 and can operate, for example, in accordance with the electromagnetic compensation of force or with wire strain gauges or with an oscillating string or the like. The digital evaluation unit is likewise located inside housing 2. Both the weighing system and the mode of operation of the digital evaluation unit are generally known and are therefore not explained and shown in detail here. The weighing system, digital evaluation unit and digital display unit are constructed so as to be intrinsically safe with regard to the possibility of explosions and are only operated with low voltages. The modifications to the construction units in order to achieve intrinsic safety with regard to explosions are relatively small, so that the electronic balance differs only somewhat from normal electronic balances not designed for use in potentially explosive areas.

A pressure-encapsulated power unit 5 is provided for the voltage supply of the electronic balance which is connected to electronic balance 2 via explosion-safe line 6 and an explosion-safe plug connection (not shown). The details of this explosion-proof design of the lead and of the plug connection are known to the expert in this art, so that the details do not need to be presented.

Figure 2:
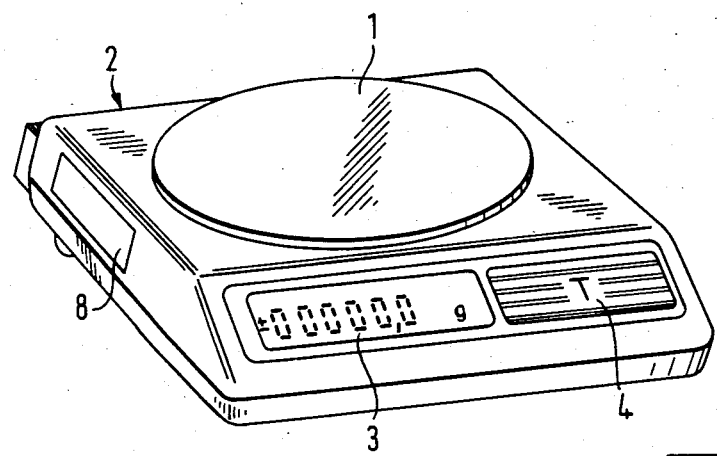
FIG. 2 shows an electronic balance similar to FIG. 1, but with battery supply.

The embodiment of FIG. 2 differs from that of FIG. 1 only by the different voltage supply wherein it is supplied in this embodiment by an intrinsically safe battery located in housing 2 behind cover 8 in a battery compartment.

FIG. 3 shows an electronic analytical balance with housing 12, constructed so that it forms a draft guard for balance scale 11, digital display unit 13, tare button 14 and additional operating keys 17 with which various weighing programs can be programmed. The low voltage for this electronic balance is supplied by powder-filled power unit 15 via explosion-safe lead 16 and plug connection 19 with an intrinsically safe design with regard to explosions.

FIG. 4 shows an electronic balance with a component separated weighing system. The mechanical weighing system is located in housing 22 and balance scale 21 constitutes the upper housing cover at the same time. The digital evaluation unit, digital display unit 23 and tare button 24 are located in separate housing 20. The two housings 20 and 22 are connected by explosion-safe lead 30 and plug connections (not shown) with an intrinsically safe design with regard to explosions. The voltage is supplied via power unit 25 which is located outside the potentially explosive area. The low voltages are fed to the electronic balance via explosion-safe lead 26.

The presented associations of various low voltage supplies by external power units or internal batteries to the various balance types are of course only intended as examples and any other combination is conventionally and naturally possible.

What is claimed is:

1. Electronic balance for use in potentially explosive areas, including a weighing system, an electronic evaluation unit and a digital display unit, the improvement comprising in that the weighing system, the electronic evaluation unit and the digital display unit are housed in the balance housing and constructed to be intrinsically safe with regard to explosions, and a power unit for supplying electric power to the weighing system, the evaluation unit and the display unit is located outside the electronic balance housing (2, 12, 20, 22) and is connected by an intrinsically safe construction to the electronic balance housing via an explosion-proof line (6, 16, 26) and plug connections (19).

2. Electronic balance according to claim 1, wherein the weighing system, the electronic evaluation unit and the digital display unit are combined in one housing.

3. Electronic balance according to claim 1, wherein the weighing system is located in a first housing (22) and the electronic evaluation unit as well as the digital display unit are located in a second housing (20), that these two housings are connected to one another via a lead (30) and plug connections with an intrinsically safe design with regard to explosions and that the power unit (25) is located in another housing and is connected via an explosion-safe lead (26) to the first or the second housing of the electronic balance.

4. Electronic balance according to either claim 1, 2 or 3, wherein the power unit (5) is encapsulated in a pressure-proof manner.

5. Electronic balance according to either claim 1, 2 or 3, wherein the power unit (15) is particulate filled.

6. Electronic balance according to either claim 1, 2 or 3, wherein the power unit is pressure-ventilated.

7. Electronic balance according to either claim 1, 2 or 3, wherein the power unit (25) is located outside the potentially explosive environment.

* * * * *